Feb. 27, 1968  T. VICHOS  3,370,517
APPARATUS FOR FORMING TUBULAR FILM

Filed June 21, 1965  2 Sheets-Sheet 1

INVENTOR.
THOMAS VICHOS
BY
ATTORNEYS

United States Patent Office 3,370,517
Patented Feb. 27, 1968

3,370,517
APPARATUS FOR FORMING TUBULAR FILM
Thomas Vichos, Twinsburg, Ohio, assignor to The Dow Chemical Company, Midland, Mich., a corporation of Delaware
Filed June 21, 1965, Ser. No. 465,563
2 Claims. (Cl. 93—82)

ABSTRACT OF THE DISCLOSURE

This invention comprises an apparatus for applying a cushion of air and thereby avoiding friction on the plastic film being fed upwardly and then reversed in direction over the upper edge of a mandrel comprising a sheet of metal turned into essentially cylindrical form with the cylinder not being completely closed, but having the lateral edges overlapping but spaced so that lateral edge portions of the film passing linearly through the interior of the cylinder will overlap each other, the sheet of plastic film being shaped into a tubular form as it passes down into the interior of the mandrel. By sealing the overlapping lateral edges of the film, the formation of the tubular film is completed. The invention resides in the feature that the only surfaces around which the plastic film passes in its reversal of direction is the upper edge of the mandrel and the tubular means for imposing the cushion of air between the plastic film and the upper edge of the mandrel.

---

This invention relates to an apparatus for forming flat film into tubular film. More specifically, it relates to an apparatus for applying a cushion of air between the sheet of plastic film and that edge of the mandrel over which the film is guided into tubular shape.

In converting long sheets of plastic film into tubular shapes for packaging of food products, such as sausage meat, biscuit dough, etc., standard commercial equipment is used such as the Kartridge-Pak machine which has a mandrel comprising a sheet of metal turned into essentially cylindrical form having a curved upper edge. The top curved edge is obtained by using for this cylinder a flat sheet of metal cut in the shape of half a circle and curving this sheet in cylindrical shape with the straight side of the sheet forming the base of the cylinder. The highest point on the top edge of the cylinder is at the side of the cylinder opposite from the overlapping edges. The overlapping edges of the sheet of metal are held spaced from each other so that film can be passed down between the two edges.

In shaping the sheet of film, this mandrel is held in a vertical position with the film being fed from a roll of film positioned below and to the rear of the mandrel, that is on the side having the highest upper edge. The film is fed into the mandrel at an angle of approximately 160°, over the upper edge of the mandrel and then downwardly into the interior of the mandrel where the linear edges of the resultant tube are overlapped and subsequently lap-sealed by passing through a field of high frequency radio waves.

In passing the film over the upper edge of the mandrel, considerable friction and drag is applied to the film. This undesirable drag limits the rate at which the film can be passed over the mandrel and also very often interferes with the sealing operation.

In accordance with the present invention, this friction or dragging effect is substantially eliminated or reduced by the application of a thin layer or cushion of air between the film and the mandrel edge over which the film is reversed in direction to form the tubular shape. As described hereinafter there are various methods of producing and applying the air cushion which separates the film from the mandrel as the direction of film travel is reversed from an upward to a downward path.

Most effective for applying the air cushion is a small tube fitted over the upper edge of the mandrel having a number of openings therein through which air is blown into contact with the plastic film so as to space it a short distance from the tube and the upper edge of the mandrel itself.

The apparatus of this invention is best illustrated by reference to the accompanying drawings.

The size of the tube, the number of openings, the size of openings, the pressure of the compressed air supplied to the tube, etc. are determined according to various factors such as the size of the sheet being shaped into tubular form, the amount of drag over the mandrel to be overcome, the rate at which the film is being fed over the mandrel, the nature of the film material itself with respect to cling or frictional forces, etc. These factors are adjusted accordingly to give the desired spacing between the film and the upper edge of the mandrel.

The best method for determining the air pressure and the thickness of the air cushion or air film which will give the optimum result for a particular set of conditions such as the type of film, the diameter of the tube being formed, the speed of the film being drawn over the mandrel is merely to adjust the pressure of the air being applied to the perforated or porous tube to give a satisfactory rate of air flow to effect just barely moving the film from out of contact with the top of the mandrel.

Figure 9:
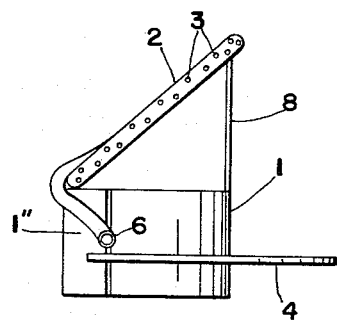
FIG. 9 shows a side elevational view of a modification in which the tube itself forms the desired angle and is supported at its highest point by a supporting rod attached to top of a mandrel having horizontal top instead of the angled top shown in FIG. 2.

As shown in FIG. 9, since the tube will provide the actual surface of contact if the air film is not applied, the tube can be placed at the desired angle for effecting the reverse in direction of the film as it passes into the mandrel and the mandrel need not be shaped at its upper edge to give this particular angle. Actually the top of the mandrel can be horizontal and the tube supported at its highest position by connection with a rod extended from the top of the mandrel to the underside of the tube. The lower part of the tube can rest directly on the top of the mandrel and be affixed thereto for additional support.

In the general method of operation for the formation of tubes according to this method, the tube is filled with the material to be packaged just below the mandrel portion and the film is drawn through the mandrel by friction wheels which are in contact with the food-containing tube. Then periodically the tube is squeezed and two clips or wires applied around the squeezed portion and the tube cut between these two wire clips.

If the speed of the film is erratic because of friction caused between the film and the top of the mandrel, this can affect the accuracy in the amount of food contained in the package. Consequently, by reducing the friction and permitting a more constant speed to be achieved, this invention results in a more accurate measurement of the amount of food in each individual package.

As previously indicated, the overlapping sections of the tube are lap-sealed by any convenient method such as high frequency radio waves, heat sealing, glue, etc. In most operations the film speed averages about 50 ft. per minute. Tubes of various sizes can be produced by this method. Typical sizes run from one-half inch in diameter to 4–5 inches in diameter.

While, as indicated above, the thickness of the air film or air cushion is not critical and generally is only sufficient to give the desired reduction and avoidance of friction between the film and the top of the mandrel, it is generally satisfactory if the air film is at least 1/64 of an inch thick, obviously even greater thicknesses can also be used provided these do not cause bulging or unevenness in the cushioning effect.

Figure 1:
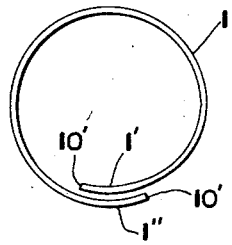
FIG. 1 shows a top view of a mandrel as presently used for forming a sheet of film into tubular shape.
Figure 1A:
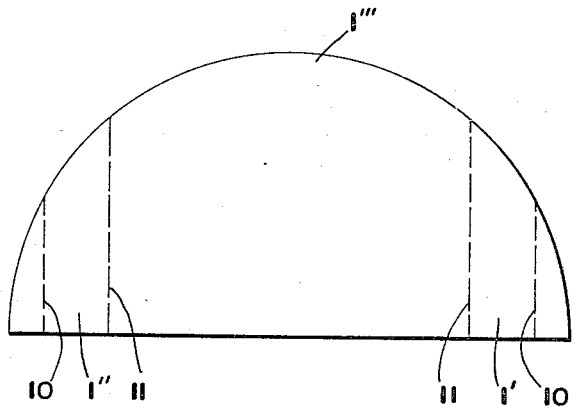
FIG. 1a represents a semi-circular flat piece of sheet metal from which the mandrel is formed.

In the drawings FIG. 1 shows by a top view that the mandrel 1 is a single sheet of metal with overlapping end sections 1' and 1". FIG. 1a shows a flat piece of sheet metal in semi-circular shape from which the mandrel is formed. If desired, the sheet can be cut at dotted lines 10 to form the straight edges 10' shown in other figures. Dotted lines 11 represent approximately the position of the overlapping edge.

Figure 2:
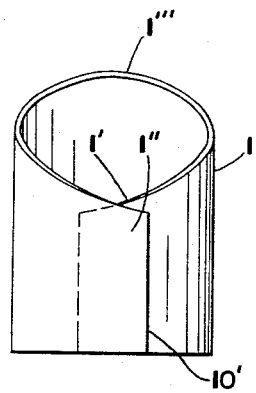
FIG. 2 shows a front elevational view of the same mandrel.

The front elevational view in FIG. 2 shows the mandrel with overlapping section 1". This view and also the side elevational view of FIG. 3 shows the highest point 1''' of the top edge of the mandrel, the lowest part of the top of the mandrel being the top edges of the overlapping sections 1" and 1'.

Figure 3:
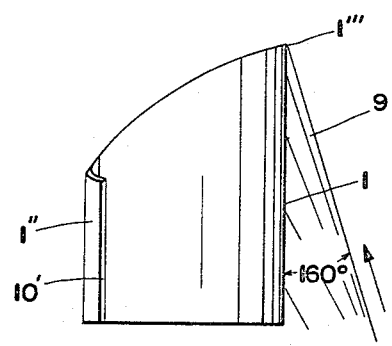
FIG. 3 shows a side elevational view of the mandrel of FIGS. 1 and 2 with film being fed into the mandrel at an appropriate angle of about 160°.

FIG. 3 shows the curvature of the top edge of the mandrel resulting from the use of the semicircular piece of sheet metal. This top edge is the circumference of the semicircle. For purpose of simplicity this curvature is not shown in the other figures showing the top edge of the mandrel and the perforated tube affixed thereto. These are represented as being straight instead of curved as they actually are.

Figure 4:
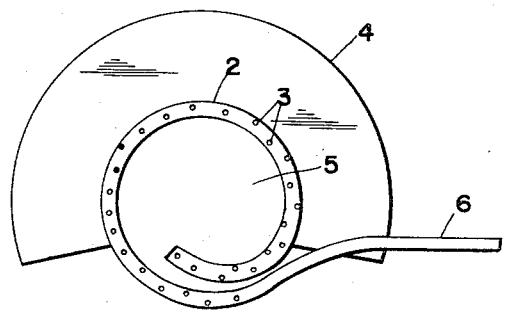
FIG. 4 shows a top plan view of the same mandrel onto which a tube has been affixed having a number of tiny openings therein.

FIG. 4 shows tube 2 with perforations or openings 3 in the tube through which air is blown. Tube 2 is positioned on the top edge of the mandrel. However, the mandrel itself is not shown since it is hidden underneath tube 2. Base 4 is a supporting means for the mandrel. The mandrel fits in opening 5 in base 4 and likewise the tubular film product passes down through this opening 5. Tube 6 is an unperforated extension of perforated tube 2 and in operation is connected to a source of compressed air which feeds air through the perforations 3 of tube 2 and thereby against the plastic film passing over the tube and downwardly into opening 5.

Figure 5:
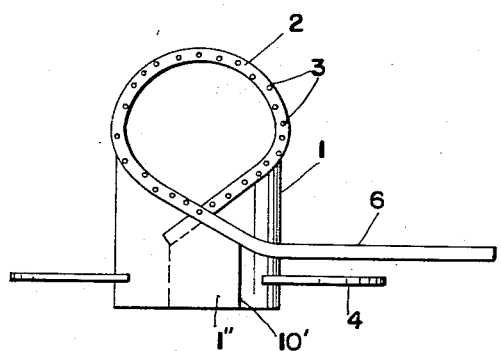
FIG. 5 shows a front elevational view of the mandrel of FIG. 4.
Figure 6:
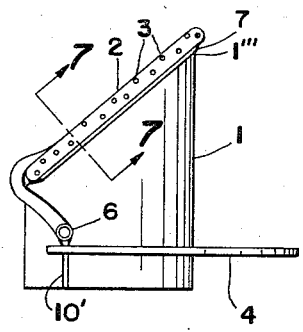
FIG. 6 shows a side elevational view of the mandrel and tube arrangement of FIGS. 4 and 5.

The front and side elevational views of FIGS. 5 and 6 show the perforated tube 2 positioned on the top edge of mandrel 1 and in a slanted position corresponding to the angle of the top edge of the mandrel with respect to the vertical axis.

Figure 8:
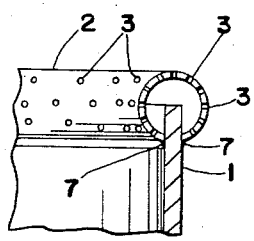
FIG. 8 shows a cross sectional view of a tube in another modification in which the porous tube has been cut and fitted over the mandrel with the cut edges of the tube brazed to the sides of the mandrel.
Figure 7:
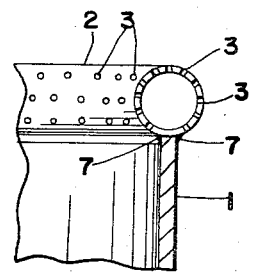
FIG. 7 shows a cross sectional elevational view of one type of structure in which the porous tube is attached directly to the top edge of the mandrel.

FIG. 7 shows a cross sectional view of perforated tube 2 taken at lines 7—7 of FIG. 6. In this case the tube rests on the upper edge surface of mandrel 1 and is brazed thereto by weld 7. FIG. 8 shows a similar cross sectional view corresponding to FIG. 7 except that in this case a slot is cut along the bottom of tube 2 and the top edge of the mandrel is inserted into the tube through this slot. The slot edge is brazed to the mandrel side surfaces by weld 7.

FIGS. 7 and 8 show the cross section of the sheet metal forming the mandrel 1 as being a straight wall section. Actually in the angular view taken, this wall section is slightly curved in accordance with the cylindrical shape but for purpose of simplicity the section is shown as a straight wall.

Obviously other means or methods of affixing the perforated tube or other air supplying means can be devised to apply a film or layer of compressed air under the plastic film passing over the mandrel edge and thereby avoid or reduce the friction between the plastic film and the mandrel edge.

Since the surface over which the plastic film is passed actually becomes the surface of the tube or possibly other air supplying means, the friction is actually between the tube and the film. For this reason, it is also possible to dispense with the slanted upper edge of the mandrel and to have the tube give the desired angle over which the plastic film is reversed in direction and shaped into the tubular form. Such a modification is shown in FIG. 9 where the mandrel has a horizontal top edge and tube 2 is slanted with its lower section resting on the top edge of overlapping edge portion 1" and the higher part of the tube 2 is supported by rod 8 which in turn is affixed to the top edge of mandrel 1.

The perforations or openings in tube 2 are not critical with regard to size and spacing. It is only necessary that they supply a sufficient amount and distribution of air to provide a cushioning layer between the film and the surface over which it passes. Obviously a greater number of small openings is preferred over a few number of larger openings, since the distribution of air will be more uniform.

In FIG. 3 the plastic film 9 is shown being fed upward at an angle of about 160° with the back wall of the mandrel 1. To avoid confusion the remainder of the film is not shown as it is fed to the entire top edge of the mandrel even into the overlapping section. This results in the formation of the tube or cylinder of the plastic film with overlapping edges as the film passes down through the inside and bottom of the mandrel as previously described.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. An apparatus for converting a sheet of plastic film into tubular film in which the plastic film is fed into a mandrel comprised of a metal sheet formed into a substantially cylindrical shape with linear edges of the sheet overlapping but spaced from each other so as to be just short of forming a cylindrical shape with overlapping contacting edges, with the said film being passed upwardly at an angle of approximately 160° with the axis of said mandrel and then over the top edge of said mandrel and downwardly into the interior of said mandrel and with a portion of said film traveling between the two spaced overlapping edges of said sheet forming said mandrel, said mandrel having the top edge of said metal sheet as the only surface over which said film passes in its said reversal of direction; the improvement comprising a tublar means for directing compressed air at that area of said film which is about to and would otherwise come into contact with the upper edge of said mandrel as the film is being reversed from an upwardly to a downwardly direction, thereby decreasing the contact between said film and said upper edge of said mandrel, said metal sheet edge and said tubular means being the only surfaces around which said film passes in its said reversal of direction and said tubular means comprising a tube positioned on said upper edge of said mandrel, said tube having a plurality of small openings therein adapted to direct the passage of compressed air onto the area of said plastic film which otherwise would come in contact with the top of said mandrel.

2. The apparatus of claim 1 in which said tube is positioned at an angle of approximately 45° to the linear axis of said mandrel.

References Cited

UNITED STATES PATENTS

| | | | | |
|---|---|---|---|---|
| 101,700 | 4/1870 | Bancroft | | 239—567 |
| 652,141 | 6/1900 | Raupp | | 239—567 |
| 2,872,762 | 2/1959 | Dreeben | | 93—82 |
| 2,940,408 | 6/1960 | Monsees | | 93—82 |
| 3,042,103 | 7/1962 | McDevitt | | 93—82 |
| 3,122,072 | 2/1964 | Monsees | | 93—82 |
| 3,261,901 | 7/1966 | Kopp | | 264—219 |

ROBERT WHITE, *Primary Examiner.*

R. R. KUCIA, *Assistant Examiner.*